United States Patent
Ashida

(10) Patent No.: US 9,366,533 B2
(45) Date of Patent: Jun. 14, 2016

(54) ELECTRONIC DEVICE

(75) Inventor: Takeshi Ashida, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 502 days.

(21) Appl. No.: 13/881,264

(22) PCT Filed: Sep. 22, 2011

(86) PCT No.: PCT/JP2011/071611
§ 371 (c)(1),
(2), (4) Date: Apr. 24, 2013

(87) PCT Pub. No.: WO2012/066850
PCT Pub. Date: May 24, 2012

(65) Prior Publication Data
US 2013/0218515 A1    Aug. 22, 2013

(30) Foreign Application Priority Data
Nov. 18, 2010 (JP) .................. 2010-257984

(51) Int. Cl.
*G01C 17/00* (2006.01)
*G01C 17/28* (2006.01)
*G01C 17/02* (2006.01)
*G01C 17/38* (2006.01)

(52) U.S. Cl.
CPC .............. *G01C 17/02* (2013.01); *G01C 17/28* (2013.01); *G01C 17/38* (2013.01)

(58) Field of Classification Search
USPC ........................................ 702/141
See application file for complete search history.

(56) References Cited

U.S. PATENT DOCUMENTS

| 8,005,635 | B2 * | 8/2011 | Lin ................................. 702/92 |
| 2006/0010699 | A1 * | 1/2006 | Tamura ...................... 33/355 R |
| 2006/0184336 | A1 | 8/2006 | Kolen |
| 2006/0195254 | A1 | 8/2006 | Ladetto et al. |
| 2010/0033424 | A1 | 2/2010 | Kabasawa et al. |
| 2011/0105957 | A1 * | 5/2011 | Kourogi et al. ............... 600/595 |

FOREIGN PATENT DOCUMENTS

| CN | 1854763 | A | 11/2006 | |
| CN | 1971309 | A | 5/2007 | |
| CN | 101387518 | A | 3/2009 | |
| CN | 102297693 | | * 12/2011 | ............ G01C 21/16 |
| JP | 8-278137 | A | 10/1996 | |
| JP | 2002-90150 | A | 3/2002 | |

(Continued)

OTHER PUBLICATIONS

Communication dated Aug. 18, 2015 from the Japanese Patent Office in counterpart application No. 2012-544144.

(Continued)

*Primary Examiner* — Huan Tran
(74) *Attorney, Agent, or Firm* — Sughrue Mion, PLLC

(57) ABSTRACT

Control section (160) is configured to measure the azimuth of electronic device (100) on the basis of the result detected by geomagnetic sensor (120) for detecting geomagnetism, and on the basis of the result detected by motion sensor (130) for detecting movement of electronic device (100), and is configured, while motion sensor (130) is detecting that electronic device (100) is stationary, to measure the azimuth of electronic device (100) only on the basis of the result detected by motion sensor (130), and the azimuth measured by control section (160) is displayed by display section (170).

6 Claims, 6 Drawing Sheets

(56) References Cited

FOREIGN PATENT DOCUMENTS

| | | |
|---|---|---|
| JP | 2004-117139 A | 4/2004 |
| JP | 2005-291932 A | 10/2005 |
| JP | 2006-047038 A | 2/2006 |
| JP | 2006-275523 A | 10/2006 |
| JP | 2008-96131 A | 4/2008 |
| JP | 2008-107102 A | 5/2008 |
| JP | 2008-309594 A | 12/2008 |
| JP | 2009-122041 A | 6/2009 |
| JP | 2009-168678 A | 7/2009 |
| JP | 2009-186376 A | 8/2009 |
| JP | 2010-169574 A | 8/2010 |
| WO | 97/24584 A1 | 7/1997 |
| WO | 2009/008411 A1 | 1/2009 |

OTHER PUBLICATIONS

Communication dated Oct. 20, 2014, issued by the State Intellectual Property Office of the People's Republic of China in corresponding Chinese Application No. 201180054905.1.

Communication dated Jan. 26, 2016 from the European Patent Office issued in corresponding Application No. 11842308.6.

* cited by examiner

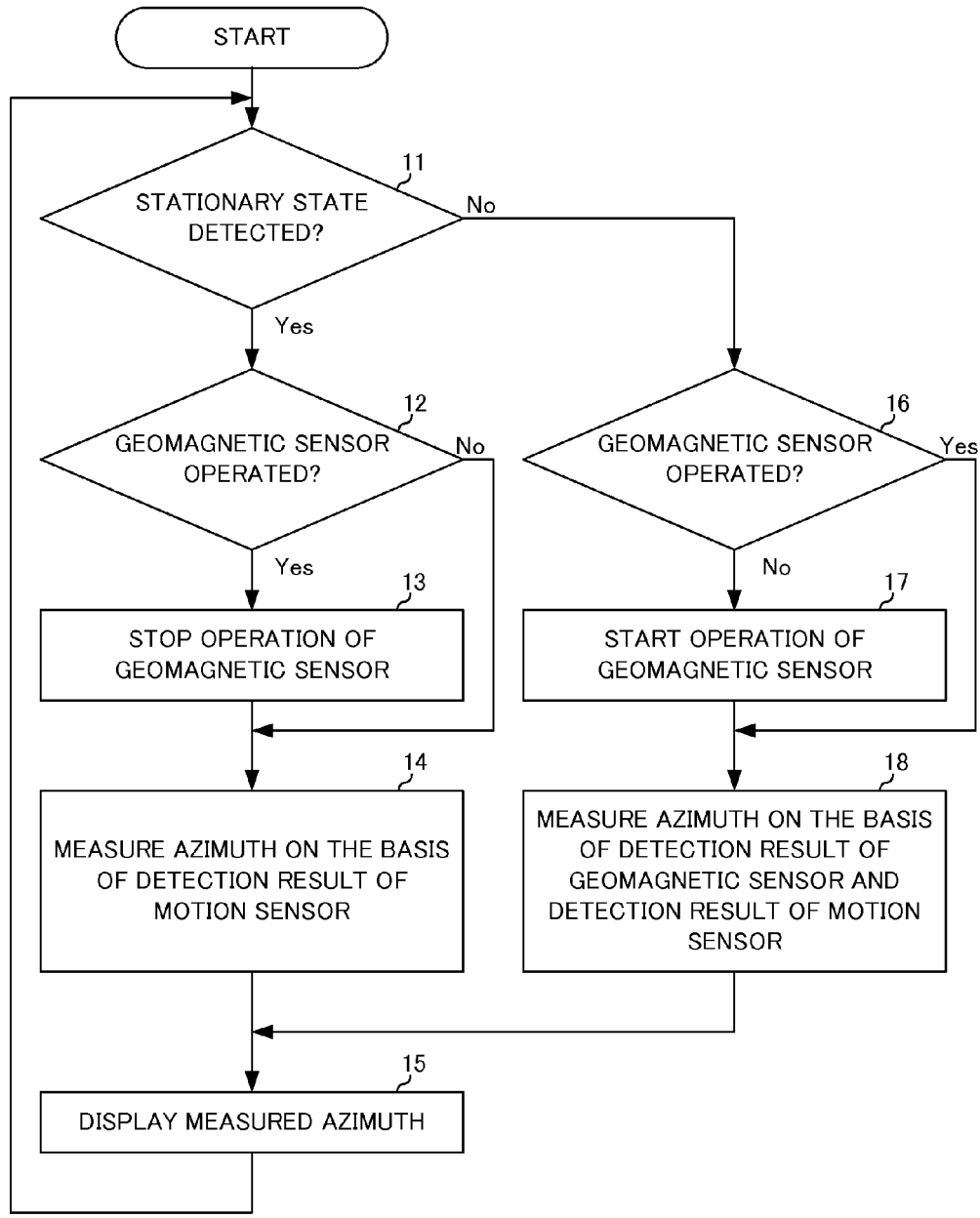

ELECTRONIC DEVICE

CROSS REFERENCE TO RELATED APPLICATIONS

This application is a National Stage of International Application No. PCT/JP2011/071611 filed Sep. 22, 2011, claiming priority based on Japanese Patent Application No. 2010-257984, filed Nov. 18, 2010, the contents of all of which are incorporated herein by reference in their entirety.

TECHNICAL FIELD

The present invention relates to an electronic device for measuring the azimuth, and also relates to an azimuth measuring method and program.

BACKGROUND ART

In an electronic compass for measuring the azimuth, the azimuth measurement is performed by detecting geomagnetism by using a geomagnetic sensor. Specifically, when the magnetic field is changed by movement of the electronic compass, and the like, the detected azimuth is changed according to the movement.

Further, when the electronic compass is mounted to an electronic device, such as a portable terminal, the azimuth can be obtained by the portable terminal, and the like.

However, when the azimuth measurement is performed only on the basis of geomagnetism detected by the geomagnetic sensor, accurate azimuth measurement cannot be performed in the state where the electronic device is inclined. For this reason, in recent years, an electronic device has been devised, which, in addition to a geomagnetic sensor, is provided with an acceleration sensor (configured as a six-axis sensor = a three-axis sensor + a three-axis sensor) for detecting acceleration as the movement of the electronic device. For example, a technique has been known, in which accurate azimuth measurement is performed regardless of the attitude of the electronic device by correcting the inclination angle of the electronic device (see, for example, Patent Literature 1).

Further, it has been known that, in an azimuth meter using a geomagnetic sensor, it is necessary to perform offset correction when the magnetic field is unexpectedly disturbed, and hence a method of performing the offset correction has been proposed (see, for example, Patent Literature 2).

Further, a method has been known, in which a plurality of offsets of a geomagnetic sensor are provided respectively for the attitudes and states of an electronic device (for example, opened and closed states of a portable terminal) (see, for example, Patent Literature 3).

CITATION LIST

Patent Literature

Patent Literature 1: JP08-278137A
Patent Literature 2: JP2006-047038A
Patent Literature 3: JP2005-291932A

SUMMARY OF INVENTION

Technical Problem

However, the above-described techniques have the following problems.

In the above-described techniques, detection using the geomagnetic sensor is continued, and the detection result of the geomagnetic sensor also continues to be reflected in the azimuth measurement. For this reason, at the time of occurrence of noise, disturbance, or the like, by which an offset is erroneously obtained, the offset correction is erroneously performed. As a result, a malfunction may be caused.

An object of the invention is to provide an electronic device, and an azimuth measuring method and program, which solve the above-described problems.

Solution to Problem

An electronic device according to the present invention is an electronic device including:
a geomagnetic sensor that detects geomagnetism;
a motion sensor that detects movement of the electronic device;
a control section that is configured to detect the azimuth of the electronic device on the basis of the result detected by the geomagnetic sensor and on the basis of the result detected by the motion sensor, and is configured, while the motion sensor is detecting that the electronic device is stationary, to detect the azimuth of the electronic device only on the basis of the result detected by the motion sensor; and
a display section that displays the azimuth measured by the control section.

Further, an azimuth measuring method according to the present invention is an azimuth measuring method of measuring the azimuth of an electronic device, the azimuth measuring method including:
geomagnetism detection processing for detecting geomagnetism;
motion detection processing for detecting movement of the electronic device;
processing for measuring the azimuth of the electronic device on the basis of the result detected in the geomagnetism detection processing and on the basis of the result detected in the motion detection processing;
processing for, while the process of motion detection is detecting that the electronic device is stationary, measuring the azimuth of the electronic device only on the basis of the result detected in the motion detection processing; and
processing for displaying the measured azimuth.

Further, a program according to the present invention is a program configured to be executed by an electronic device, the program including:
a geomagnetism detection procedure for detecting geomagnetism;
a motion detection procedure for detecting movement of the electronic device;
a procedure for measuring the azimuth of the electronic device on the basis of the result detected by the geomagnetism detection procedure and on the basis of the result detected by the motion detection procedure;
a procedure for, while the procedure of motion detection is detecting that the electronic device is stationary, measuring the azimuth of the electronic device only on the basis of the result detected by the motion detection procedure; and
a procedure for displaying the measured azimuth.

Advantageous Effect of Invention

As described above, with the present invention, it is possible to prevent a malfunction of the electronic compass.

BRIEF DESCRIPTION OF DRAWINGS

FIG. 6 is a flow chart for explaining another example of the azimuth measuring method in the electronic device shown in FIG. 1.

DESCRIPTION OF EMBODIMENTS

In the following, exemplary embodiments will be described with reference to the accompanying drawings.

Figure 1:
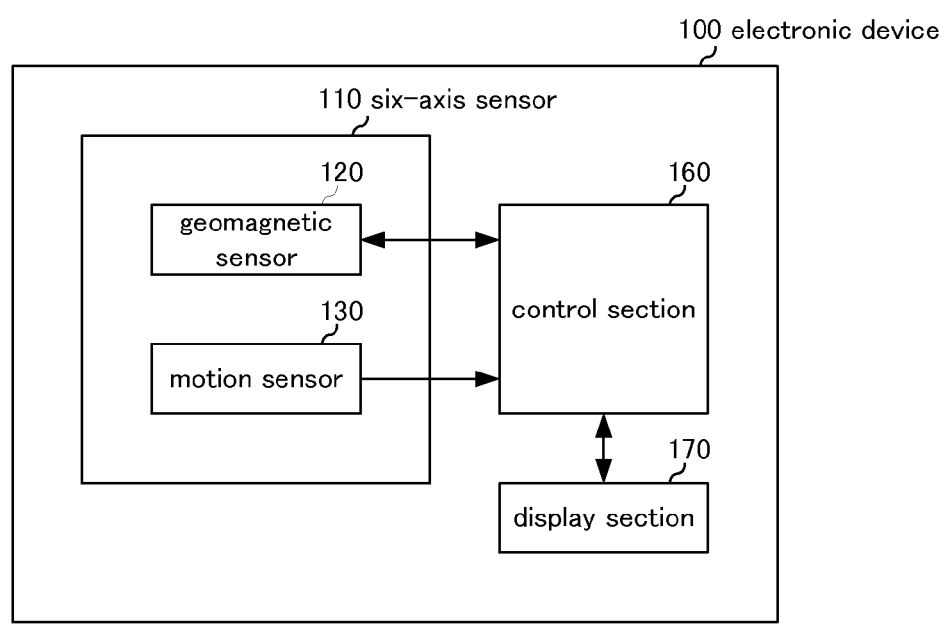
FIG. 1 is a view showing an exemplary embodiment of an electronic device according to the present invention.

FIG. 1 is a view showing an exemplary embodiment of an electronic device according to the present invention.

As shown in FIG. 1, electronic device 100 according to the exemplary embodiment is provided with six-axis sensor 110, control section 160, and display section 170. Note that, in FIG. 1, among the components provided in electronic device 100, only the components related to the present invention are shown, and illustration of other components provided in an ordinary electronic device (illustration of, for example, a communication section, a storing section, an audio processing section, a power supply section, and the like, in the case where electronic device 100 is a portable terminal) is omitted.

Six-axis sensor 110 is configured by geomagnetic sensor 120 which is a three-axis (three dimensional) geomagnetic sensor, and motion sensor 130 which is a three-axis motion sensor.

Geomagnetic sensor 120 detects geomagnetism. Geomagnetic sensor 120 outputs the detection result to control section 160.

Motion sensor 130 detects movement of electronic device 100. Further, motion sensor 130 outputs the detection result to control section 160.

Figure 2:
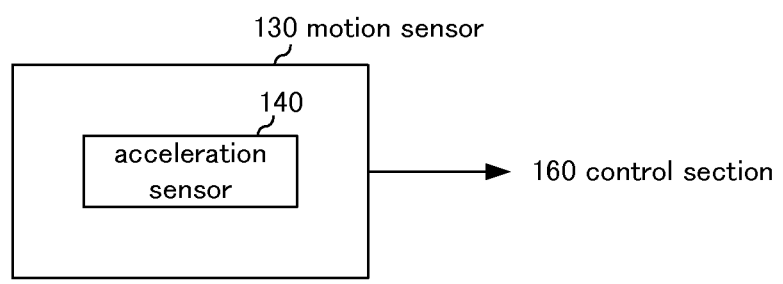
FIG. 2 is a view showing an example of the internal configuration of the motion sensor shown in FIG. 1.

FIG. 2 is a view showing an example of the internal configuration of motion sensor 130 shown in FIG. 1.

As shown in FIG. 2, motion sensor 130 shown in FIG. 1 may be configured by acceleration sensor 140 which is a three-axis acceleration sensor that detects the acceleration of electronic device 100.

Figure 3:
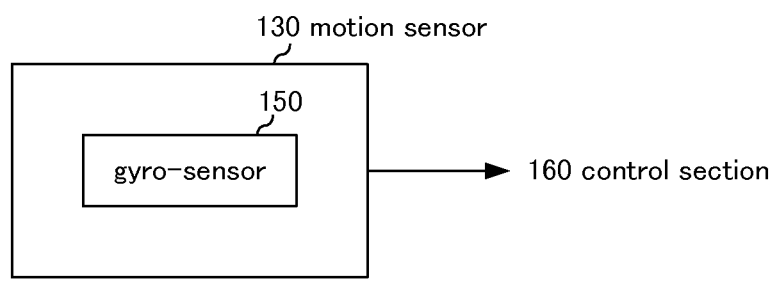
FIG. 3 is a view showing another example of the internal configuration of the motion sensor shown in FIG. 1.

FIG. 3 is a view showing another example of the internal configuration of the motion sensor 130 shown in FIG. 1.

As shown in FIG. 3, motion sensor 130 shown in FIG. 1 may be configured by gyro-sensor 150 which detects the rotation of electronic device 100.

Further, motion sensor 130 may also be configured by a vibration sensor which detects the vibration of electronic device 100.

Control section 160 measures (calculates) the azimuth of electronic device 100 on the basis of the result outputted from geomagnetic sensor 120 and on the basis of the result outputted from motion sensor 130.

Further, when the result outputted from motion sensor 130 indicates that electronic device 100 is stationary, control section 160 measures (calculates) the azimuth of electronic device 100 only on the basis of the result outputted from motion sensor 130. At this time, control section 160 may be configured to ignore (discard) the result outputted from geomagnetic sensor 120 and to measure the azimuth of electronic device 100 only on the basis of the result outputted from motion sensor 130, or may be configured to stop the operation of geomagnetic sensor 120 and to measure the azimuth of electronic device 100 only on the basis of the result outputted from motion sensor 130.

Display section 170 displays the azimuth measured (calculated) by control section 160.

Further, a nine-axis sensor may also be used instead of six-axis sensor 110.

Figure 4:
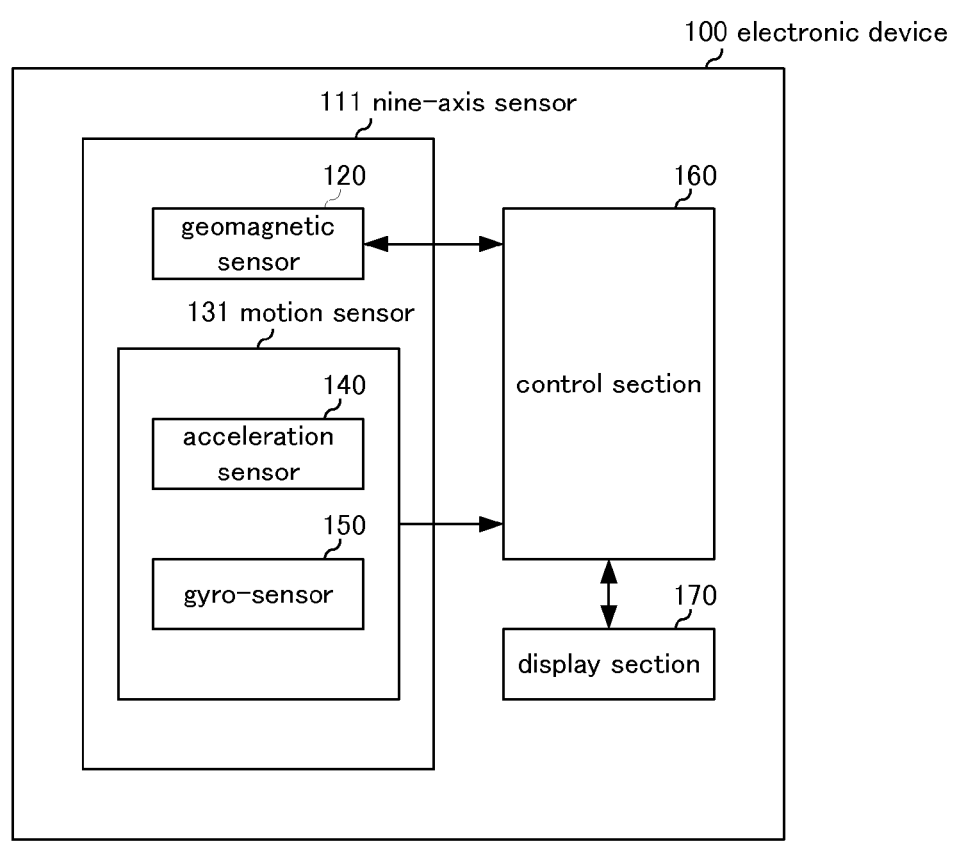
FIG. 4 is a view showing another exemplary embodiment of the electronic device according to the present invention.

FIG. 4 is a view showing another exemplary embodiment of the electronic device according to the present invention.

As shown in FIG. 4, electronic device 100 in the exemplary embodiment is provided with nine-axis sensor 111 instead of six-axis sensor 110 shown in FIG. 1.

Nine-axis sensor 111 is configured by geomagnetic sensor 120 and motion sensor 131.

Further, motion sensor 131 is configured by acceleration sensor 140 and gyro-sensor 150.

The operations of acceleration sensor 140 and gyro-sensor 150 are the same as the operations described with reference to FIG. 2 and FIG. 3.

Control section 160 shown in FIG. 4 measures (calculates) the azimuth of electronic device 100 on the basis of the result outputted from geomagnetic sensor 120 and on the basis of the results outputted from acceleration sensor 140 and gyro-sensor 150 each provided in motion sensor 131.

Further, when the results outputted from acceleration sensor 140 and gyro-sensor 150 that are each provided in motion sensor 131 indicate that electronic device 100 is stationary, control section 160 shown in FIG. 4 measures (calculates) the azimuth of electronic device 100 only on the basis of the results outputted from acceleration sensor 140 and gyro-sensor 150 that are each provided in motion sensor 131.

In the following, the azimuth measuring method performed in electronic device 100 shown in FIG. 1 will be described.

Figure 5:
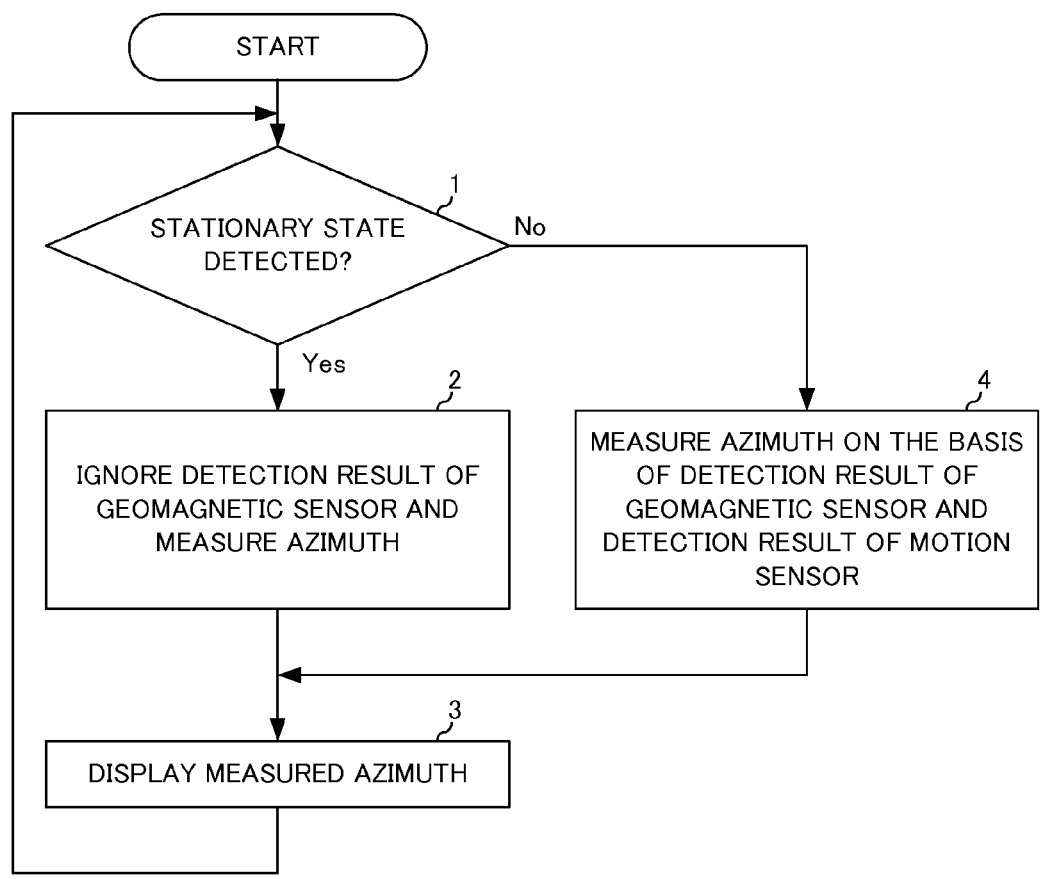
FIG. 5 is a flow chart for explaining an example of an azimuth measuring method in the electronic device shown in FIG. 1.

FIG. 5 is a flow chart for explaining an example of an azimuth measuring method in electronic device 100 shown in FIG. 1.

First, when the operation of azimuth measurement (electronic compass) is started, the detection of geomagnetism by geomagnetic sensor 120, and the detection of movement of electronic device 100 by motion sensor 130 are started.

Then, the azimuth of electronic device 100 is measured (calculated) by control section 160 on the basis of the result of detection of geomagnetism by geomagnetic sensor 120 and on the basis of the result of detection of movement of electronic device 100 by motion sensor 130.

Further, in step 1, motion sensor 130 detects whether or not electronic device 100 is stationary.

When motion sensor 130 detects that electronic device 100 is stationary, the detection result of geomagnetic sensor 120 is ignored by control section 160 in step 2, and the azimuth of electronic device 100 is measured only on the basis of the detection result of motion sensor 130.

Subsequently, in step 3, the azimuth measured by control section 160 is displayed in display section 170.

On the other hand, in step 1 when motion sensor 130 does not detect that electronic device 100 is stationary, the azimuth of electronic device 100 is measured by control section 160 in step 4 on the basis of the result of detection of geomagnetism by geomagnetic sensor 120 and on the basis of the result of detection of movement of electronic device 100 by motion sensor 130, and processing in step 3 is performed.

Thereafter, while motion sensor 130 in step 1 detects that electronic device 100 is stationary, processing of step 2 is performed. Further, thereafter, in step 1 when motion sensor 130 does not detect that electronic device 100 is stationary, processing in step 4 is performed.

FIG. 6 is a flow chart for explaining another example of the azimuth measuring method in electronic device 100 shown in FIG. 1.

When the operation of azimuth measurement (electronic compass) is started, detection of geomagnetism by geomagnetic sensor 120, and detection of movement of electronic device 100 by motion sensor 130 are started.

Then, the azimuth of electronic device 100 is measured (calculated) by control section 160 on the basis of the result of detection of geomagnetism by geomagnetic sensor 120 and on the basis of the result of detection of movement of electronic device 100 by motion sensor 130.

Further, in step 11, motion sensor 130 detects whether or not electronic device 100 is stationary.

When motion sensor 130 detects that electronic device 100 is stationary, control section 160 determines in step 12 whether or not geomagnetic sensor 120 is being operated.

When geomagnetic sensor 120 is operated, the operation of geomagnetic sensor 120 is stopped by control section 160 in step 13. Then, in step 14, the azimuth of electronic device 100 is measured by control section 160 only on the basis of the detection result of motion sensor 130.

Further, when geomagnetic sensor 120 is not operated, processing in step 13 is not performed, and processing in step 14 is performed.

Subsequently, in step 15, the azimuth measured by control section 160 is displayed in display section 170.

On the other hand, in step 11 when motion sensor 130 does not detect that electronic device 100 is stationary, control section 160 determines in step 16 whether or not geomagnetic sensor 120 is operated.

When geomagnetic sensor 120 is not operated, in step 17, the start of the operation of geomagnetic sensor 120 is instructed by control section 160, and the operation of geomagnetic sensor 120 is started. Further, in step 18, the azimuth of electronic device 100 is measured by control section 160 on the basis of the result of detection of geomagnetism by geomagnetic sensor 120 and on the basis of the result of detection of movement of electronic device 100 by motion sensor 130, and then the processing in step 15 is performed.

When geomagnetic sensor 120 is operated, processing in step 17 is not performed, and processing in step 18 is performed.

In the azimuth measuring method described with reference to FIG. 6, the operation of geomagnetic sensor 120 is stopped, and hence power consumption due to the operation of geomagnetic sensor 120 can be reduced.

Note that, also in the exemplary embodiment shown in FIG. 4, processing, which is the same as the processing described with reference to the flow chart shown in FIG. 5 and FIG. 6, is performed.

Note that electronic device 100 may be a portable terminal having an azimuth measuring function, or may be a pedometer having the azimuth measuring function, that is, electronic device 100 needs only to be a device or apparatus to which the electronic compass function is mounted.

As described above, only the detection result of motion sensor 130 is used for azimuth measurement while electronic device 100 is in a stationery state. Thereby, even when factors, such as disturbance and noise, which disturb the magnetic field, are generated while electronic device 100 is stationery, the azimuth is not erroneously measured by the electronic compass. Further, even when the offset of geomagnetic sensor 120 is erroneously measured, the electronic compass is not stopped, and malfunction of the electronic compass is prevented.

A configuration may be made such that processing performed by each of the components provided in electronic device 100 described above is performed by a logic circuit which is manufactured according to the purpose of the processing. Further, a configuration may also be made such that a computer program (hereinafter referred to as a program), in which the contents of the processing are described as procedures, is recorded on a recording medium which can be read by electronic device 100, and such that the program recorded on the recording medium is read into electronic device 100 and executed by electronic device 100. The recording medium which can be read by electronic device 100 means transferable recording media, such as a floppy disk (registered trademark), a magneto-optical disk, a DVD, and a CD, and also means memories, such as a ROM and a RAM, and a HDD, which are incorporated in electronic device 100. The program recorded on the recording medium is read by control section 160 provided in electronic device 100, and processing, which is the same as the processing described above, is performed by control of control section 160. Here, control section 160 is configured to operate as a computer which executes the program read from the recording medium on which the program is recorded.

In the above, the present invention has been described with reference to the exemplary embodiments, but the present invention is not limited to the exemplary embodiments. A configuration and details of the present invention may be modified in various ways within the scope of the present invention in a manner that a person skilled in the art can understand.

This application claims the benefit of priority from Japanese Patent Application No. 2010-257984 filed in Japan on Nov. 18, 2010, the entire content of which is hereby incorporated by reference in the application and claims of the present application.

The invention claimed is:

1. An electronic device comprising:
a geomagnetic sensor that detects geomagnetism;
a motion sensor that detects movement of the electronic device;
a control section that is configured to measure the azimuth of the electronic device on the basis of the result detected by the geomagnetic sensor and on the basis of the result detected by the motion sensor, and is configured, while the motion sensor is detecting that the electronic device is stationary, to measure the azimuth of the electronic device only on the basis of the result detected by the motion sensor; and
a display section that displays the azimuth measured by the control section.

2. The electronic device according to claim 1, wherein when the motion sensor detects that the electronic device is stationary, the control section stops the operation of the geomagnetic sensor.

3. The electronic device according to claim 1, wherein the motion sensor is an acceleration sensor.

4. The electronic device according to claim 1, wherein the motion sensor is a gyro-sensor.

5. The electronic device according to claim 1, wherein the motion sensor is a sensor that detects vibration of the electronic device.

6. An azimuth measuring method of measuring the azimuth of an electronic device, the azimuth measuring method comprising:
geomagnetism detection processing for detecting geomagnetism;

motion detection processing for detecting movement of the electronic device;

processing for measuring the azimuth of the electronic device on the basis of the result detected in the geomagnetism detection processing and on the basis of the result detected in the motion detection processing;

processing for, while the process of motion detection is detecting that the electronic device is stationary, measuring the azimuth of the electronic device only on the basis of the result detected in the motion detection processing; and processing for displaying the measured azimuth.

* * * * *